A. RAPP.
DEVICE FOR TESTING THE WEIGHT OF PROJECTILES AND LIKE BODIES.
APPLICATION FILED JULY 30, 1907.
919,766.
Patented Apr. 27, 1909.
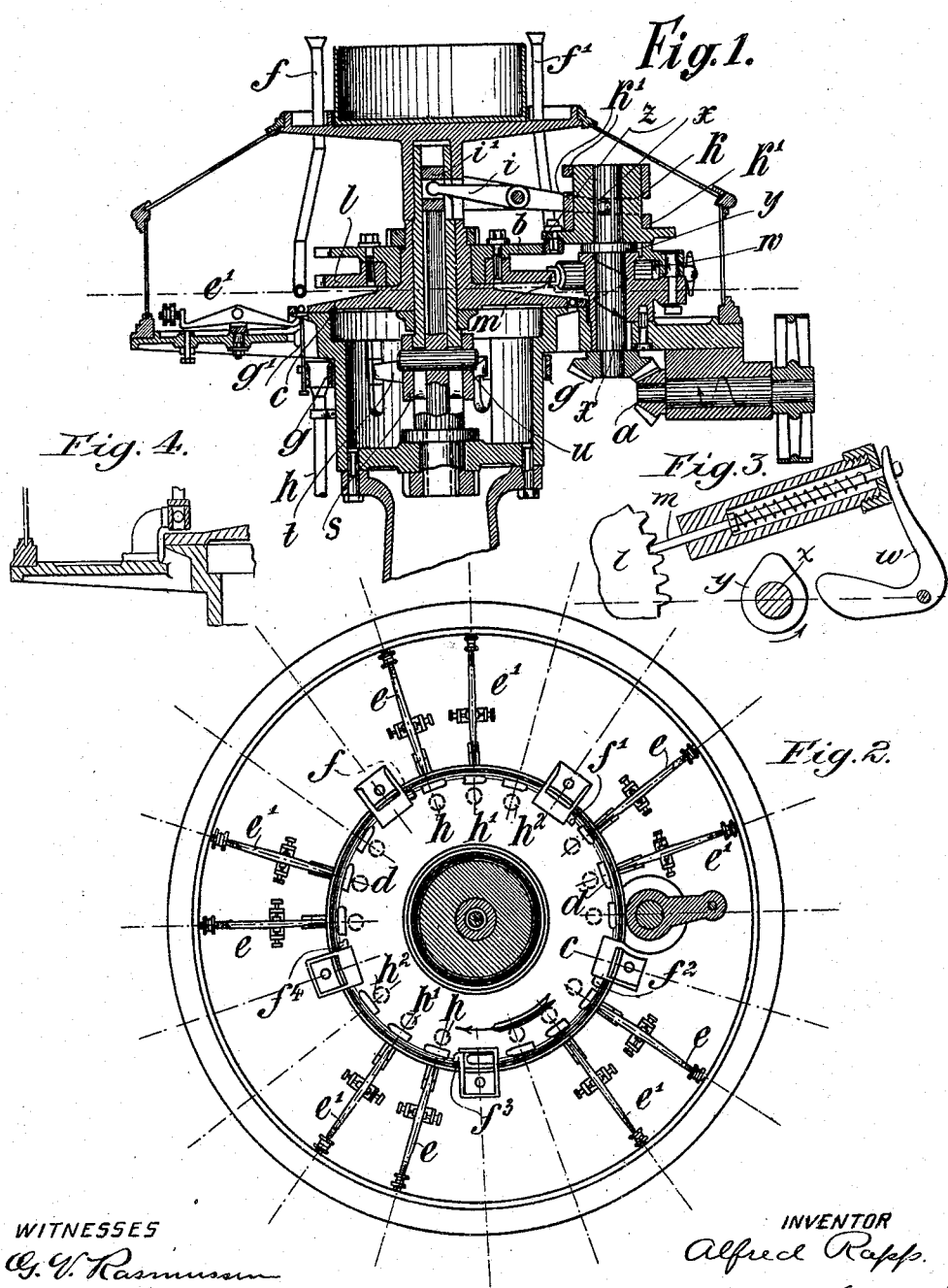
WITNESSES
INVENTOR
Alfred Rapp.
BY
ATTORNEYS

UNITED STATES PATENT OFFICE.

ALFRED RAPP, OF KARLSRUHE, GERMANY, ASSIGNOR TO DEUTSCHE WAFFEN-UND MUNITIONSFABRIKEN, OF KARLSRUHE, GERMANY.

DEVICE FOR TESTING THE WEIGHT OF PROJECTILES AND LIKE BODIES.

No. 919,766.

Specification of Letters Patent.

Patented April 27, 1909.

Application filed July 30, 1907. Serial No. 386,265.

*To all whom it may concern:*

Be it known that I, ALFRED RAPP, a subject of the German Emperor, and residing at Lenzstrasse 6, Karlsruhe, Germany, have invented a certain new and useful Improved Device for Testing the Weight of Projectiles and Like Bodies, of which the following is a specification.

The present invention relates to an improved device for testing the weights of projectiles and similar bodies.

In the testing of projectiles and like bodies by means of weighing machines operating automatically which was customary hitherto, those bodies which were too heavy, too light and of correct weight were tested by one single balance-beam which was placed in three different positions into which it could be turned by means of suitable devices. One or more such balance beams swung past three stops arranged at three different heights corresponding to the three different weights, said stops removing the projectiles from the balance-beam, and thus separating them into three classes: "too heavy", "too light" and "correct". Various disadvantages, however, are associated with such a method. Firstly it requires that the balance-beam take up a slanting position and that it be guided, whereby the required free oscillation of the same is prevented and the exactitude of the weighing process is considerably influenced. Also this method is dependent on a very wide swing of the balance-beam which necessitates much unnecessary time, apart from it prejudicing the accuracy still more, and diminishes the productive capacity. Further, in the kind of machines usual for executing this method, there are the further defects that the balance-beam must keep moving, whereby lateral displacements and shocks of the same are produced which give further occasion for stoppages and inaccuracies. Lastly, it is difficult to hold the balance-beam perfectly firm in its position of rest when the projectiles are being removed, as every beam has a different period of oscillation corresponding to the difference of the weights placed on it.

In a device constructed in accordance with the present invention, the system of weighing the projectiles with the aid of one single balance-beam used hitherto is entirely done away with, the weight of the projectile being tested at two stations successively. The projectile which is brought to the first station comes onto a first balance-beam, which is at first held perfectly rigid, where it is subjected to the test of its greatest weight. If the projectile exceeds the greatest permissible limit, the balance-beam sinks, after it is released from its detent, and throws the projectile into the waste conduit situated under it through which it is conducted to a collector. When the weight of the projectile is less than the greatest weight permissible, however, the projectile is carried further to the second station and on to a second balance-beam, from which it is thrown, if it has the correct weight, and passes through a second conduit into a second collector. A projectile which is too light, on the contrary, passes this second station also, and is conducted away behind the same through a third conduit into a third collector. As compared with the earlier method, this method has, on the one hand, the advantage of far greater accuracy in weighing, and therefore enables very much smaller allowances of weight to be observed; on the other hand, with suitably formed mechanical means, it permits of a considerably greater performance or capacity being obtained.

In order that the invention may be clearly understood reference is made to the accompanying drawing in which one form of the device is represented by way of example, and in which:

Figure 1 is a vertical section through the same. Fig. 2 is a sectional plan on the dotted line in Fig. 1. Fig. 3 is a detail plan view with parts in section of the mechanism for locking and releasing the rotary table and Fig. 4 is an enlarged detail view illustrating the support for the supply pipes.

Similar reference characters refer to similar parts in both views.

Referring to the drawing, a shaft $x$ (Fig. 1) mounted on the frame of the machine is rotated by means of toothed-wheel gearing from a source of power. On this shaft $x$ there is a box $k$ which moves a toothed-wheel $b$ intermittently by means of a pin $z$, the wheel $b$ being attached to the turn-table or traveling plate $c$. Between the toothed-wheel $b$ and the traveling plate $c$ there is another toothed-wheel $l$ with which a detent or catch $m$ engages every time the toothed wheel with the traveling plate has completed one movement. The catch $m$ is sent into the corresponding gap between the teeth of the wheel $l$ by means of a spring and it is withdrawn by a lifter, which is formed on the collar $y$ of the shaft $x$, and which rotates the lever $w$ and moves the catch $m$.

The traveling plate $c$ is provided with slot-shaped holes or incisions $d$ for the reception and conveyance of the projectiles. In the circular frame around this plate there are balance-beams $e$ and $e^1$ arranged in pairs at equal distances, on the rear ends of which the balance-weights are arranged. When the projectiles do not rest upon the ends of the balance beams $e$ or $e'$, they are supported by the flange of the frame on which the carrier or traveling plate $c$ runs. The projectiles which are supplied by means of the supply pipes $f$, $f^1$, $f^2$, $f^3$, and $f^4$ are received by the slots $d$, so that when the plate $c$ is rotated each projectile is conveyed successively to the balance-beams $e$ and $e'$ of the same pair. Preferably the operation would be so conducted as to supply a projectile simultaneously to each of the beams $e$, of which I have shown four, in the particular construction illustrated by the drawing. While the projectiles are being supplied all the balance-beams are held fast by a clamping device. The box $k$ has a slanting groove $k^1$ on its periphery, in which the pulley of a two-armed lever $i$ runs and moves a rod $i^1$ which is in the hollow shaft of the traveling plate. The hollow shaft of the traveling plate is slotted below the plate, and a pin $u$ secured to the rod $i^1$ engages the hub $s$ of arms $t$ which reciprocate a ring $g$ carrying a stop $g^1$ for each balance-beam (Fig. 1). These stops are placed against the scale-end of each of the balance-beams so that during the supply of the projectiles all the balance-beams are simultaneously held stationary. When the projectiles are at rest, the ring $g$ with its stops $g^1$ goes downward, and the balance-beams $e$, $e^1$ are released so that they can swing.

If the projectile which is placed on the balance-beam $e$ is too heavy it falls down here and passes through the conduit $h$ into a collector. If on the contrary the projectile is less than the greatest permissible weight, it is conveyed by the disk $c$, after the balance-beams have been arrested by the device $g$, in order to be subjected to another test as to its weight on the second balance-beam $e^1$. If the projectile has the correct weight, the balance-beam $e^1$ turns and throws it through the conduit $h'$ (Fig. 2) into a second collector. If, on the contrary the weight of the projectile is less than the correct weight, it is conveyed farther by the disk $c$ and falls behind the balance-beam $e^1$ through the conduit $h^2$ into a third receptacle. In this manner the projectiles are separated according to three classes of weight those of each class going into a special receptacle for the same. As already mentioned, during the conveyance and placing of the projectiles on the balance-beams, the latter are held fast by the device $g$ which contributes substantially to the accuracy of the weighing.

What I claim as my invention and desire to secure by Letters Patent is:—

1. In an automatic weighing device, the combination of a frame, a shaft thereon, a circular traveling plate having holes and revoluble on said frame, a toothed wheel coaxially attached to said plate, a driving member on said shaft adapted to drive said wheel once for each revolution of said shaft, a spring-pressed detent on said frame normally engaging said wheel, another driving member on said shaft for withdrawing said detent from said wheel once for each revolution of said shaft, with a plurality of balance-beams arranged in pairs on said frame around said plate and having the scale-ends of said beams under the path of said holes.

2. In an automatic weighing device, the combination of a frame, a shaft thereon, a circular traveling plate having holes and revoluble on said frame, a toothed wheel coaxially attached to said plate, a box on said shaft, a pin on said box adapted to drive said wheel once for each revolution of said shaft, detent means on said frame normally engaging said wheel, means actuated by said shaft for withdrawing said detent means from said wheel once for each revolution of said shaft, with a plurality of balance-beams arranged in pairs on said frame around said plate and having the scale-ends of said beams under the path of said holes.

3. In an automatic weighing device, the combination of a frame, a driving shaft thereon, a box having a groove on its periphery on said shaft, a hollow shaft having an opening on said frame, a turn-table having holes and revoluble on said hollow shaft, a toothed wheel attached coaxially to said turn-table, a plurality of balance-beams arranged in pairs on said frame around said plate and having the scale-ends of said beams under said holes, a lever revoluble on said frame, one end of said lever being guided in said groove, the other end of said lever passing through said opening into said hollow shaft, a rod in the latter attached by one end to said lever, a ring having arms attached to the other end of said rod, and a plurality of stops on said ring under said balance-beams, whereby when said former shaft is rotated, said lever is oscillated and said stops hold and release said balance-beams.

In testimony whereof, I affix my signature in the presence of two witnesses.

ALFRED RAPP.

Witnesses:
SOPHIE RAPP,
JOS. H. LEUTE.